United States Patent [19]

Hayasaki

[11] Patent Number: 4,876,925

[45] Date of Patent: Oct. 31, 1989

[54] HYDRAULIC CONTROL SYSTEM FOR AUTOMATIC AUTOMOTIVE TRANSMISSION

[75] Inventor: Koichi Hayasaki, Fujisawa, Japan

[73] Assignee: Nissan Motor Co., Ltd., Yokohama, Japan

[21] Appl. No.: 185,437

[22] Filed: Apr. 25, 1988

[30] Foreign Application Priority Data

Jun. 15, 1987 [JP] Japan ................................ 62-147140

[51] Int. Cl.⁴ ............................................ B60K 41/16
[52] U.S. Cl. ..................................................... 74/868
[58] Field of Search ........................... 74/868, 869, 867

[56] References Cited

U.S. PATENT DOCUMENTS

| | | | |
|---|---|---|---|
| 3,000,230 | 9/1961 | Froslie | 74/869 |
| 3,446,098 | 5/1969 | Searles | 74/869 |
| 3,453,908 | 7/1969 | Iijima | 74/869 |
| 4,005,620 | 2/1977 | Dach et al. | 74/869 X |
| 4,273,009 | 6/1981 | Iwanaga et al. | 74/868 X |
| 4,526,065 | 7/1985 | Rosen et al. | 74/869 |
| 4,587,887 | 5/1986 | Shibayama et al. | 74/868 X |

FOREIGN PATENT DOCUMENTS

| | | | |
|---|---|---|---|
| 54-123656 | 9/1979 | Japan | 74/868 |
| 58-156757 | 9/1983 | Japan . | |
| 60-211152 | 10/1985 | Japan | 74/869 |

*Primary Examiner*—Dirk Wright
*Attorney, Agent, or Firm*—Foley & Lardner, Schwartz, Jeffery, Schwaab, Mack, Blumenthal & Evans

[57] ABSTRACT

A throttle pressure adjustment valve is fluidly inteposed between a throttle valve and the shift valves and arranged to boost the level of throttle pressure under low engine load to a predetermined level. While the governor pressure is either very low or non-existent the elevated throttle pressure suitably modifies the shift charactertics of the transmission and obviates the generation of backlash noise and shifting in rapid succession under such conditions.

3 Claims, 4 Drawing Sheets

HYDRAULIC CONTROL SYSTEM FOR AUTOMATIC AUTOMOTIVE TRANSMISSION

BACKGROUND OF THE INVENTION

1. Field of the Invention

The present invention relates generally to hydraulic control systems for automatic automotive transmissions and more specifically to a system suited to controlling the operation of a four speed type transmission.

2. Description of the Prior Art

JP-A-58-156757 discloses a hydraulic control system for a four speed type automatic automotive type transmission which includes a plurality of shift valves. These valves are basically responsive to throttle pressure indicative of the load on the engine and governor pressure which is indicative of the vehicle speed. By appropriately arranging these valves it is possible to derive a suitable 1-2-3-4 shift pattern.

However, with this arrangement when the vehicle slows to a stop, backlash noise tends to be produced. That it is to say, at low vehicle speeds when a 3-2-1 downshift sequence take place, or when, at relatively high vehicle speeds, a 3-2 downshift occurs and a load is placed on the torque outputted by the output shaft of the transmission (i.e. engine braking wherein the engine is driven by the wheels of the slowing vehicle), a momentary reversal of torque occurs. As a result, the gears which are meshing undergo a momentary torque fluctuation and produce the backlash noise.

To overcome this problem it is possible to induce a 3-1 downshift at low vehicle speeds. In order to achieve this the 3-2 downshift line and the 2-1 downshift line should intersect under low throttle valve settings. However, in the event that the 2-3 downshift line is set in the low vehicle speed range, especially at low throttle settings, the 2-3 upshift line is also drawn into this region.

Accordingly, under relatively low engine load (viz., small throttle valve settings) a 2-3 upshift tends to occur very shortly after the transmission has undergone a 1-2 shift and deteriorates the shift feeling.

SUMMARY OF THE INVENTION

It is an object of the present invention to provide a control arrangement for a multi speed automatic transmission which obviates the generation of backlash noise and improves the shift feeling by preventing sequential shifts from occurring in quick succession In brief, the above object is achieved by a hydraulic control circuit which includes a throttle pressure adjustment valve which is fluidly interposed between a throttle valve and the shift valves and arranged to boost the level of throttle pressure under low engine load to a predetermined level. While the governor pressure is either very low or non-existent the elevated throttle pressure suitably modifies the shift characteristics of the transmission and obviates the generation of backlash noise and shifting in rapid succession under such conditions.

More specifically, the present invention takes the form of a hydraulic control circuit for a multi-speed automatic transmission for an automotive vehicle which features: a source of line pressure; a source of throttle pressure which varies with the load on a prime mover associated with the transmission; a source of governor pressure, the source of governor pressure being arranged to produce pressure only after the speed of the vehicle has reached a predetermined value and to thereafter produce a pressure which varies with the vehicle speed; a shift valve, the shift valve having a first port in communication with the source of governor pressure and a second port in communication with the source of throttle pressure; a throttle pressure adjustment valve, the throttle pressure adjustment valve being fluidly communicated with the source of line pressure and the source of throttle pressure, the throttle pressure adjustment valve being fluidly interposed between the source of throttle pressure and the second port of the shift valve, the throttle pressure adjustment valve being responsive to the throttle pressure from the source of throttle pressure being below a predetermined value and arranged to increase the level of throttle pressure supplied to the second port of the shift valve.

A second aspect of the present invention comes in that the throttle pressure adjustment valve comprises: a valve bore; a first port, the first port being communicated with the source of line pressure; a second port, the second port being communicated with the second port of the shift valve; a third port, the third port being communicated with the source of throttle pressure; a spool reciprocatively disposed in the bore, the spool defining a feedback chamber in a first end of the valve bore, the spool having first and second lands, the first land being exposed to the feedback chamber and arranged to control communication between the first and second ports, the second land controlling communication between the second and third ports; a spring, the spring biasing the spool toward the first end of the valve bore; and a passage formed in the spool; the passage leading from a location between the first and second lands to a portion of the spool exposed to the feedback chamber.

A third aspect of the invention comes in that the first land has an effective area A exposed to the pressure prevailing in the feedback chamber; and the spring produces a force F which acts against the force produced by the pressure in the feedback chamber acting on the effective surface area A; the arrangement being such that while the throttle pressure is below a value of F/A the spool assumes a position wherein the first land permits communication between the first and second ports to be established and permits line pressure to be in part admitted into the second port while the second land restricts communication between the second and third ports, the arrangement being further such that when the throttle pressure exceeds the value F/A, the spool assumes a position wherein the first land prevents communication between the first and second ports and the second land assumes a position wherein full communication between the second and third ports is established and the level of throttle pressure fed to the second port of the shift valve becomes equal to the level of throttle pressure produced by the source of throttle pressure.

A further aspect of the invention comes in that the hydraulic control system further comprises: a pump, the pump discharging hydraulic fluid under pressure which is supplied to the source of line pressure and the source of throttle pressure; a strainer associated with the pump for removing foreign particles from the hydraulic fluid which is inducted into the pump, the strainer including a magnet which attracts magnetic material out of the hydraulic fluid.

DETAILED DESCRIPTION OF THE PREFERRED EMBODIMENTS

Figure 5:
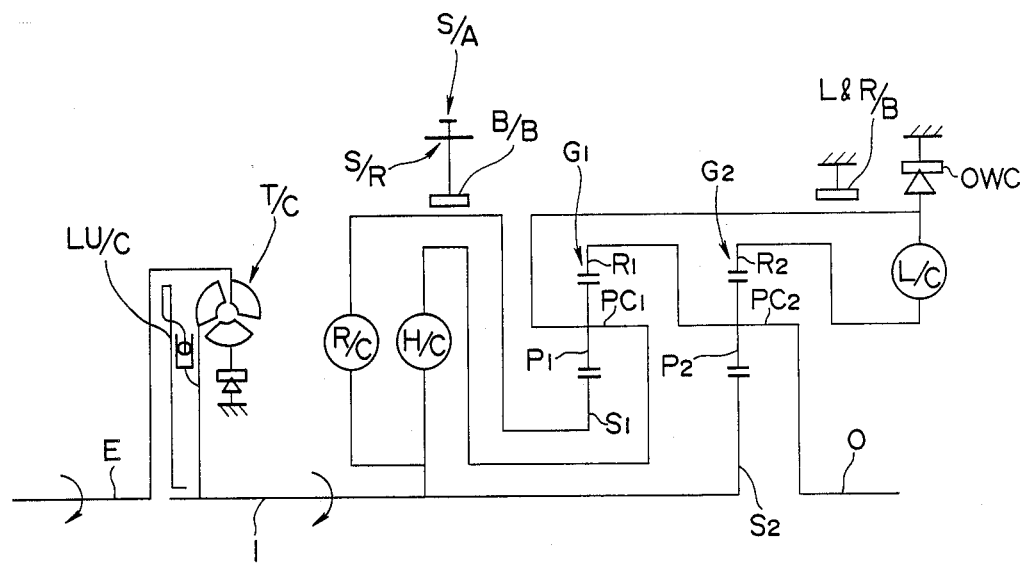
FIG. 5 is a schematic diagram showing a transmission gear train representative of that which the embodiment invention is applied.

FIG. 5 shows the gear train of a four speed transmission with overdrive type transmission. In this arrangement engine torque is transmitted from an engine power output shaft E to an input shaft I of the transmission via a torque converter T/C and lock up clutch LU/C. A transmission output shaft 0 operatively interconnects a final drive gear unit with first and second planetary gear units G1 and G2. In these units R/C denotes a reverse clutch; H/C a high clutch; L/C a low clutch; L&R/B low and reverse brake; and B/B a band brake.

In the first planetary gear unit G1, S1 denotes a sun gear; R1 an internal ring gear; and PC1 a carrier supporting pinion gears P1 which mesh with the sun and ring gears S1, R1.

In the second planetary gear unit S2 denotes a sun gear; R2 an inner ring gear; and PC2 a carrier which supports pinion gears P2. These gears mesh with the sun and ring gears S2 and R2 as shown.

Carrier PC1 is selectively connectable with the input shaft I by way of the high clutch H/C. Sun gear S1 is selectively connectable with the input shaft I by way of reverse clutch R/C. Carrier PC1 is selectively connectable with inner ring gear R2 by way of low clutch L/C. Sun gear S2 is directly connected with the input shaft I for synchronous rotation therewith.

Inner ring gear R1 and carrier PC2 are connected with the transmission output shaft 0. Carrier PC1 is selectively connectable to the casing of the transmission by way of the low and reverse brake L&R/B while the sun gear S1 is similarly arranged to be rendered stationary by application of the band brake B/B.

A one-way clutch OWC is operatively connected with the carrier PC1 in manner to permit the latter to rotate only in the direction that the engine input shaft E is driven to rotate and act as a brake which prevents the reverse rotation.

The above arrangement is such that selective operation of the clutches R/C, H/C and L/C, the brakes L&B/B, OWC and B/B can be controlled in manner to produce four forward gears and one reverse - in the manner indicated in Table 1 (see the last page of the specification).

Figure 6:
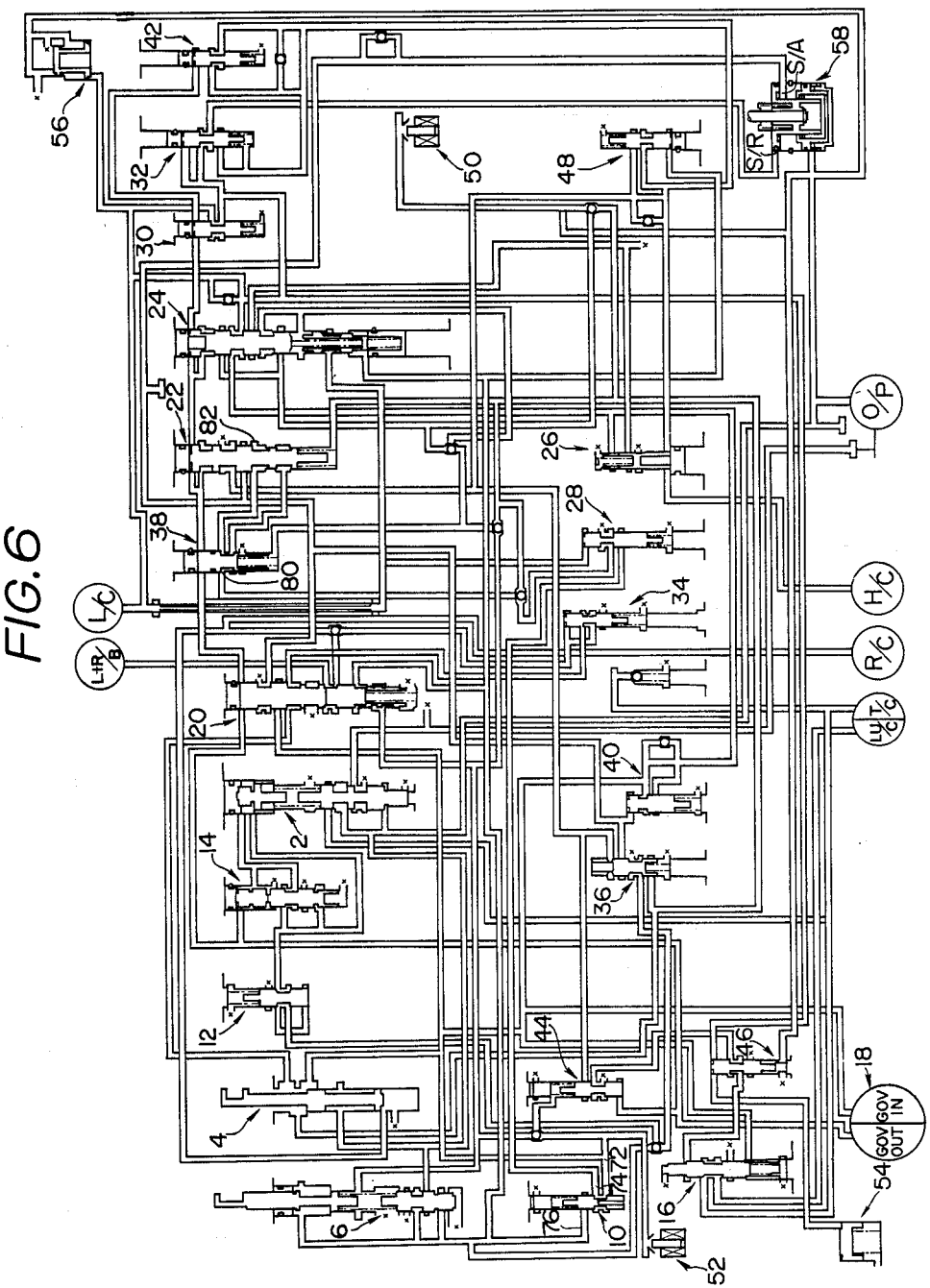
FIG. 6 shows a hydraulic control circuit in which an embodiment of the inventive throttle pressure adjustment valve is incorporated.

In the system shown in FIG. 6 the numeral 2 denotes a regulator valve; 4 denotes a manual valve; 6 a throttle valve; 10 a throttle pressure adjustment valve; 12 a pressure modulator valve; 14 a cutback valve; 16 a lock-up control valve; 18 a governor valve; 20 a 1-2 shift valve; 22 a 2-3 shift valve; 24 a 3-4 shift valve; 26 a timing valve; 28 a 4-3-2 relay valve; 30 is a 4-3 timing valve; 32 is a servo release timing valve; 34 is a first speed fixed range pressure reduction valve; 36 is a backup valve; 38 is a 3-2 downshift valve; 40 a select timing valve; 42 is a 3-2 timing valve; 44 is a speed cut valve; 46 is a lock-up timing valve; 48 is a selector valve; 50 is a overdrive inhibitor solenoid valve; 52 is a lockup inhibitor solenoid; 54 is a lock-up accumulator; 56 is a low clutch accumulator; and 58 is a bandbrake servo which forms part of the band brake B/B.

These valve are operatively connected with an oil pump O/P torque converter T/C, lock-up clutch LU/C and the other friction elements listed earlier.

It should be noted that band brake B/B includes a servo unit which includes a servor apply chamber S/A and a servo release chamber S/R. The effective area of the servo release chamber S/R is larger than that of the servo apply chamber S/A with the result that upon pressurization of the release chamber the band brake is conditioned to assume a released state even if the apply chamber is simultaneously pressurized.

The present invention is characterized by the provision of the throttle pressure adjustment valve 10.

Figure 1:
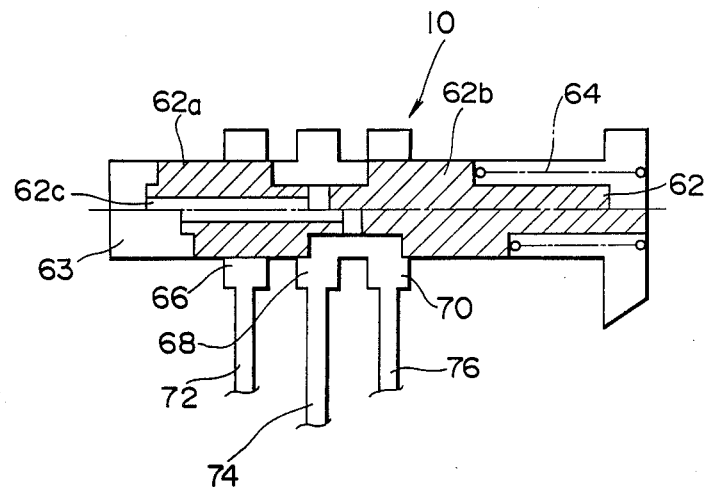
FIG. 1 a sectional elevation of a throttle pressure adjustment valve which characterizes the system according to the present invention.

As shown in FIG. 1, this valve includes a single spool 62 which is reciprocatively disposed in a valve bore and biased by a spring 64 toward one end of the same. The spool has two lands 62a and 62b. An axial passage 62c and intersecting radial bore provide fluid communication between the space defined in the valve bore between the two lands, and a feedback chamber 63 defined in end of the bore towards which the spool 62 is biased by the spring 64.

The valve bore is formed with ports 66, 68 and 70.

The first port 66 is fluidly connected with a source of line pressure by way of conduit 72. The second port 68 is communicated with port 80 of the downshift valve 38 and port 82 of the 2-3 shift valve 22 by way of the 4-3-2 relay valve 28 and conduit 74. It should be noted that the pressure applied to port 80 of the 3-2 shift downshift valve 38 and to port 82 of the 2-3 shift valve 22 is such as to act against the influence produced by the governor pressure.

The third port 70 is supplied with throttle pressure from the throttle valve 6 by way of conduit 76.

When the throttle pressure supplied to port 70 via conduit 76 is low the spool 62 assumes the position illustrated by the upper sectional half. Under these conditions line pressure from conduit 72 is supplied via port 66 into port 68. The line pressure and the pressure prevailing in conduit 74 in part exhaust via port 70. The pressure is simultaneously supplied through conduit 62c into the feedback chamber 63 and acts on the land 62a. The pressure acts against the bias of the spring 64 in manner to modulate the pressure prevailing in the second port 68.

Assuming that the effective area of the land 62a exposed to the feedback chamber 63 is A and the force produced by the spring is F then the pressure prevailing in the second port 68 becomes a function of F/A. However, this relationship holds only while the pressure in port 70 is lower than that prevailing in port 68 and disappears when pressure can no longer be relieved via port 70. Viz., when the throttle pressure supplied through conduit 76 exceeds F/A the function of the throttle pressure adjustment valve 10 is lost as the pressure which is fed into the feedback chamber 63 rises to the point where the value of F is such that the spool moves to the right as seen in the drawings and land 62a closes port 66. From this time the pressure prevailing in conduit 74 becomes equal to that prevailing in conduit 76 (viz throttle pressure).

Figure 2:
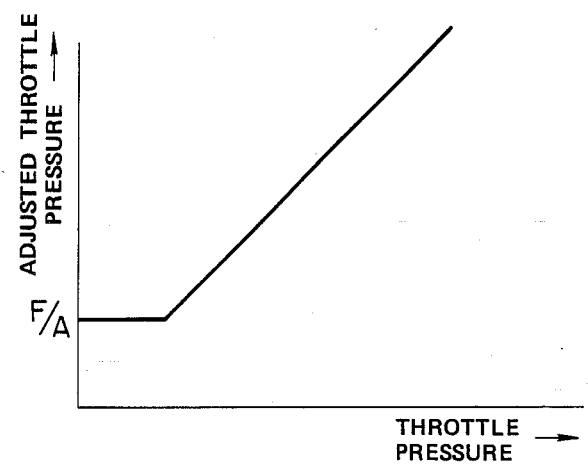
FIG. 2 is a graph showing in terms of adjusted throttle pressure and normal throttle pressure, the pressure control characteristics produced by the valve which the present invention.

Accordingly, the characteristics of the pressure in conduit 74 varies as shown in FIG. 2. Viz., as shown until the throttle pressure becomes equal to F/A then the pressure prevailing in conduit 74 remains constant at the F/A value.

As mentioned above, conduit 74 communicates with port 80 of the 3-2 downshift valve 38 and port 82 of the 2-3- shift valve 22. Accordingly, when the throttle pressure (produced by the throttle valve 6) is lower than F/A, the throttle pressure adjustment valve supplies the F/A pressure to these ports and establishes a balance with the instant governor pressure.

Figure 3:
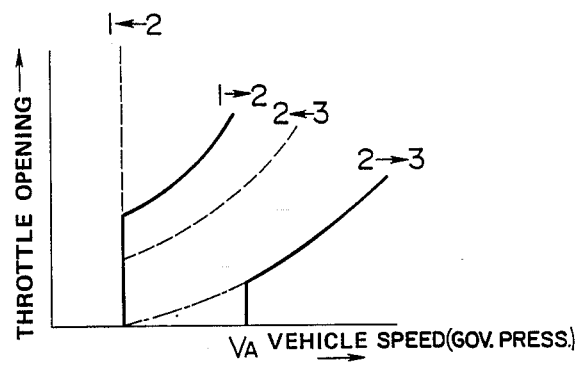
FIG. 3 is a chart showing in terms of throttle valve opening and vehicle speed, the shift pattern developed with the provision of the present invention.

Accordingly, the 2-3 downshift line assumes the characteristics shown in broken line in FIG. 3. Thus, while the vehicle speed remains below the value VA, the 1-2 upshift line and the 2-3 upshift line are separated by a suitably large amount and the shifting in rapid succession such as experienced with the prior art, is obviated. Viz., the shifting characteristics are improved from those shown in FIG. 4(a) to those shown in FIG. 3.

Figure 4B:
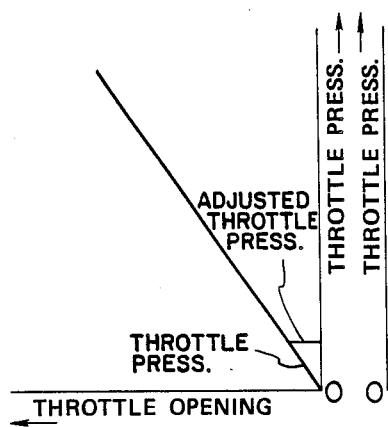
FIGS. 4(a) 4(b) and 4(c) are charts showing the pressure development and shift characteristics with the prior art arrangement disclosed in the opening of the instant disclosure.
Figure 4A:
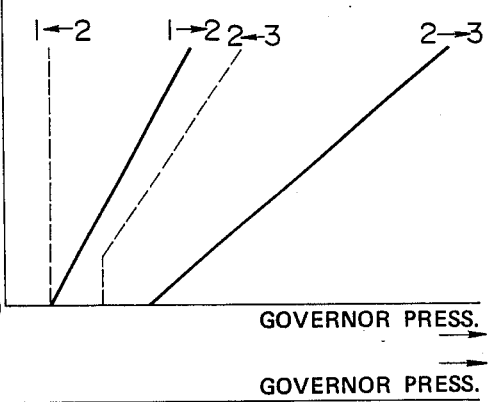
Figure 4C:
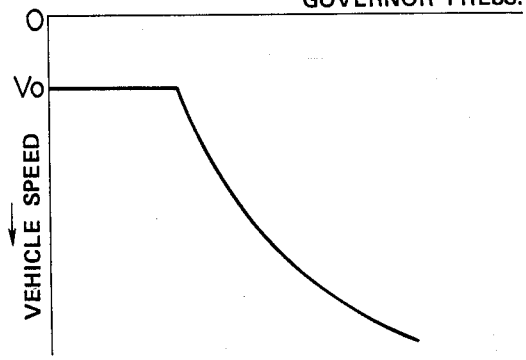

The governor and throttle pressures at which the 2-3 shift valve, 3-2 downshift valve 38 and the 1-2 shift valve 20 undergo shifting are controlled by the effective surface areas of the spools and the force of the springs associated therewith. The manner in which the control basically takes place in the prior art arrangement discussed in the opening paragraphs of the instant disclosure is shown in FIG. 4(a). It will be noted that governor pressure varies according to the fixed schedule shown in FIG. 4(c) and as shown in this figure, no governor pressure is developed until the vehicle speed reaches a critical value of Vo. Above this speed the pressure develops suddenly as indicated by the solid line trace in FIG. 4(c). It will be appreciated that FIG. 4(a) shows the shift characteristics which are derived with a system wherein the throttle pressure and governor pressure vary as indicated in FIGS. 4(b) and 4(c).

TABLE 1

| | R/C | H/C | L/C | L & R/B (OWC) | B/B | GEAR RATIO | 1 = 0.45 2 = 0.45 |
|---|---|---|---|---|---|---|---|
| 1ST | | | o | o | | $\frac{1+\alpha_2}{\alpha_2}$ | 3.22 |
| 2ND | | | o | | o | $\frac{\alpha_1+\alpha_2}{\alpha_2(1+\alpha_1)}$ | 1.38 |
| 3RD | | o | o | | | 1 | 1 |
| 4TH | | o | | | o | $\frac{1}{1+\alpha_1}$ | 0.69 |
| 5TH | o | | | | o | $\frac{-1}{\alpha_1}$ | −2.22 |

What is claimed is:

1. A hydraulic control circuit for a multi-speed automatic transmission for an automotive vehicle, comprising:
   a source of line pressure;
   a source of throttle pressure which varies with the load on a prime mover associated with the transmission;
   a source of governor pressure, said source of governor pressure being arranged to produce pressure only after the speed of the vehicle has reached a predetermined value and to thereafter produce a pressure which varies with the vehicle speed;
   a shift valve, said shift valve having a first port in communication with said source of governor pressure and a second port in communication with said source of throttle pressure;
   a throttle pressure adjustment valve, said throttle pressure adjustment valve being fluidly communicated with said source of line pressure and said source of throttle pressure, said throttle pressure adjustment valve being fluidly interposed between said source of throttle pressure and the second port of said shift valve, said throttle pressure adjustment valve being responsive to the throttle pressure from said source of throttle pressure being below a predetermined value and arranged to increase the level of throttle pressure supplied to the second port of said shift valve.

2. A hydraulic control circuit as claimed in claim 1 wherein said throttle pressure adjustment valve comprises:
   a valve bore;
   a first port, said first port being communicated with said source of line pressure;
   a second port, said second port being communicated with the second port of said shift valve;
   a third port, said third port being communicated with said source of throttle pressure;
   a spool reciprocatively disposed in said bore, said spool defining a feedback chamber in a first end of the said valve bore, said spool having first and second lands, said first land being exposed to said feedback chamber and arranged to control communication between said first and second ports, said second land controlling communication between said second and third ports;
   a spring, said spring biasing said spool toward the first end of said valve bore; and
   a passage formed in said spool; said passage leading from a location between said first and second lands to a portion of said spool exposed to said feedback chamber.

3. A hydraulic control system as claimed in claim 2 wherein:
   said first land has an effective area A exposed to the pressure prevailing in said feedback chamber; and
   said spring produces a force F which acts against the force produced by the pressure in said feedback chamber acting on said effective surface area A;
   the arrangement being such that while said throttle pressure is below a value of F/A the spool assumes a position wherein said first land permits communication between said first and second ports to be established and permits line pressure to be partially in an admitted into said second port while said second land restricts communication between said second and third ports, the arrangement being further such that when the throttle pressure exceeds the value F/A, the spool assumes a position therein said first land prevents communication between said first and second ports and said second land assumes a position wherein full communication between said second and third ports is established and the level of throttle pressure fed to the second port of said shift valve becomes equal to the level of throttle pressure produced by said source of throttle pressure.

* * * * *